(12) United States Patent
Luo et al.

(10) Patent No.: US 8,724,710 B2
(45) Date of Patent: May 13, 2014

(54) METHOD AND APPARATUS FOR VIDEO ENCODING WITH HYPOTHETICAL REFERENCE DECODER COMPLIANT BIT ALLOCATION

(75) Inventors: Jiancong Luo, West Windsor, NJ (US); Hua Yang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 463 days.

(21) Appl. No.: 12/932,167

(22) Filed: Feb. 18, 2011

(65) Prior Publication Data

US 2011/0216837 A1 Sep. 8, 2011

Related U.S. Application Data

(60) Provisional application No. 61/307,540, filed on Feb. 24, 2010.

(51) Int. Cl.
*H04N 7/12* (2006.01)
*H04B 1/66* (2006.01)
*H04N 7/26* (2006.01)

(52) U.S. Cl.
USPC ............ 375/240.25; 375/240.26; 375/240.16; 375/240.24; 375/240.18

(58) Field of Classification Search
USPC ................ 375/240.25, 240.03, 240.26, 240.1
IPC ........................................ H04N 7/26
See application file for complete search history.

(56) References Cited

U.S. PATENT DOCUMENTS

| | | | | |
|---|---|---|---|---|
| 6,339,617 | B1 * | 1/2002 | Ueda ........................ | 375/240.16 |
| 2003/0058931 | A1 * | 3/2003 | Zhang et al. ............. | 375/240.01 |
| 2004/0005007 | A1 * | 1/2004 | Viscito et al. ............ | 375/240.25 |
| 2004/0047423 | A1 * | 3/2004 | Viscito et al. ............ | 375/240.26 |
| 2005/0084007 | A1 * | 4/2005 | Lightstone et al. ...... | 375/240.03 |
| 2007/0058729 | A1 * | 3/2007 | Yoshinari ................. | 375/240.25 |
| 2010/0246662 | A1 * | 9/2010 | Koto et al. ................ | 375/240.1 |
| 2010/0316122 | A1 * | 12/2010 | Chen et al. .............. | 375/240.12 |
| 2011/0032999 | A1 * | 2/2011 | Chen et al. .............. | 375/240.26 |

OTHER PUBLICATIONS

Ma et al., "Rate Control for JVT Video Coding Scheme with HRD Considerations", Image Processing, 2003, ICIP 2003, 2003 International Conference, vol. 3, Sep. 14-17, 2003, pp. III-793-6 vol. 2.
Li et al., "Adaptive Rate Control with HRD Consideration", JVT of ISO/IEC MPEG & ITU-T VCEG, Document: JVT-H-014, 8th Meeting: Geneva, May 20-26, 2003.

* cited by examiner

*Primary Examiner* — Thao X Le
*Assistant Examiner* — Long Le
(74) *Attorney, Agent, or Firm* — Robert D. Shedd; Paul P. Kiel; Guy H. Eriksen

(57) ABSTRACT

A method and apparatus are provided for encoding with hypothetical reference decoder compliant bit allocation. The apparatus includes an encoder (100) for encoding image data for a picture in a resultant bitstream by controlling a bit allocation during the encoding of the image data responsive to satisfying requirements for a subsequent decoding of the bitstream. The requirements relate to preventing at least one of an underflow condition and an overflow condition in a buffer during the subsequent decoding of the bitstream.

20 Claims, 4 Drawing Sheets

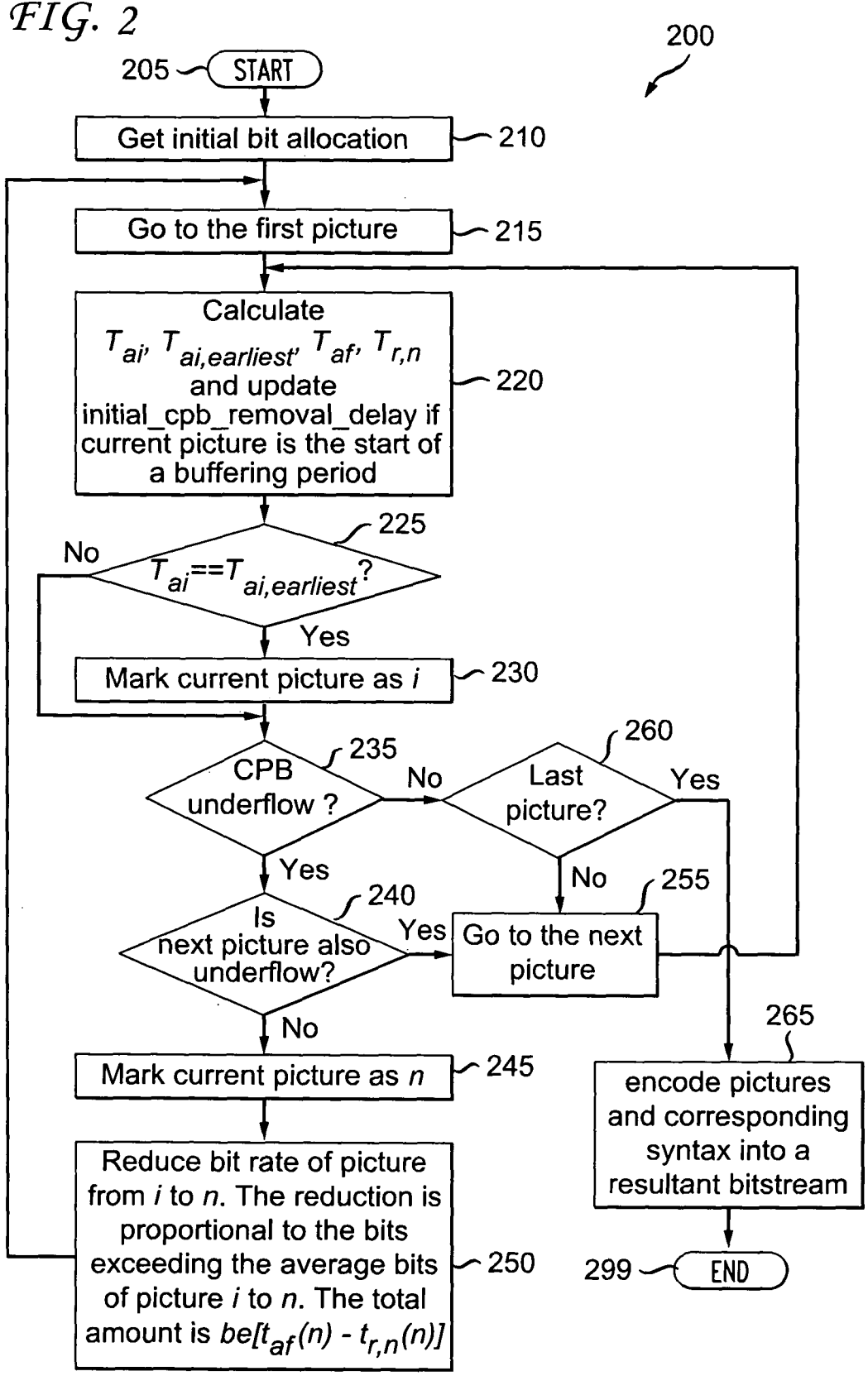

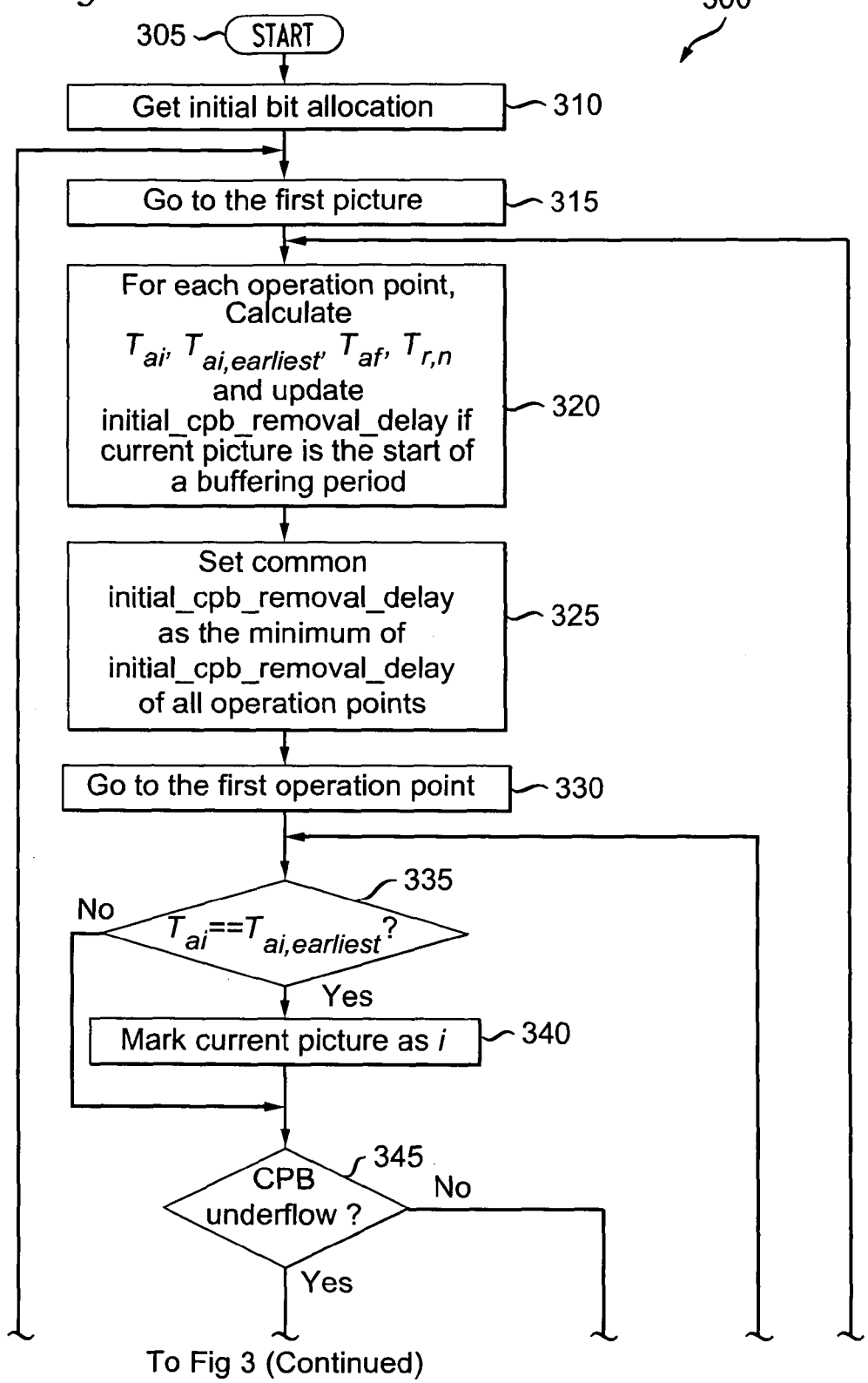

METHOD AND APPARATUS FOR VIDEO ENCODING WITH HYPOTHETICAL REFERENCE DECODER COMPLIANT BIT ALLOCATION

CROSS-REFERENCE TO RELATED APPLICATIONS

This application claims the benefit of U.S. Provisional App. Ser. No. 61/307,540, filed Feb. 24, 2010, which is incorporated by reference herein in its entirety.

TECHNICAL FIELD

The present principles relate generally to video encoding and, more particularly, to a method and apparatus for video encoding with hypothetical reference decoder compliant bit allocation.

BACKGROUND

Hypothetical reference decoder (HRD) conformance is typically a normative part of video compression standards and recommendations. A hypothetical reference decoder generally presents a set of requirements on the bitstream. A hypothetical reference decoder verifier may include software and/or hardware and is typically used to verify conformance of a bitstream to the requirements by examining the bitstream, detecting whether any hypothetical reference decoder errors exist and, if so, reporting such errors.

In the context of video compression standards, such as the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Standard, the International Telecommunication Union, Telecommunication Sector (ITU-T) H.261 Recommendation, the ITU-T H.263 Recommendation, and the ISO/IEC MPEG-4 Part 10 Advanced Video Coding (AVC) Standard/ITU-T H.264 Recommendation (hereinafter the "MPEG-4 AVC Standard"), a bitstream is determined to be conformant if the bitstream adheres to the syntactical and semantic rules embodied in the standard or recommendation. One such set of rules takes the form of a successful flow of the bitstream through a mathematical or hypothetical model of the decoder, which is conceptually connected to the output of an encoder and receives the bitstream from the encoder. Such a model decoder is referred to a hypothetical reference decoder in some standards or recommendations or the video buffer verifier (VBV) in other standards or recommendations. In other words, the hypothetical reference decoder specifies rules that bitstreams generated by a video encoder adhere to for such an encoder to be considered conformant under a given standard or recommendation. HRD is typically a normative part of video coding standards and, hence, any bitstream under a given standard has to adhere to the hypothetical reference decoder rules and constraints, and a real decoder can assume that such rules have been conformed with and such constraints have been met.

In the MPEG-4 AVC Standard, a hypothetical reference decoder and its operations are defined. The encoder is required to control the bit rate fluctuations so that the hypothetical reference decoder of a given buffer size would decode the video bit stream without suffering from buffer overflow or underflow.

Rate control algorithms with consideration given to hypothetical reference decoder compliance have been proposed previously. In these proposals, an upper bound of the bits for current picture is derived based on the current coded picture buffer (CPB) buffer status. While the cause of coded picture buffer underflow is the bits accumulated over multiple pictures prior to the underflow, restricting the bits for a single picture is inappropriate.

Digital video compression has been widely applied to TV broadcast, home entertainment, online streaming, and so forth. Depending on the application, a video bitstream can be coded using a constant bit rate (CBR) or a variable bit rate (VBR). With CBR, the bit rate of the bitstream is kept constant over a buffer period. The bits would be uniformly distributed to each picture regardless of the complexity of each picture. With VBR, the bit rate of the bitstream is not required to be constant. Bits can be allocated based on the complexity of the each picture, in order to stabilize picture quality. Both a constant bit rate and a variable bit rate require the coded picture buffer not to underflow or overflow. While the solution for a constant bit rate is straightforward, the solution for a variable bit rate can be complex since the bit allocation for a variable bit rate needs to consider both the picture complexity and the hypothetical reference decoder buffer constraints.

SUMMARY

These and other drawbacks and disadvantages of the prior art are addressed by the present principles, which are directed to a method and apparatus for video encoding with hypothetical reference decoder compliant bit allocation.

According to an aspect of the present principles, there is provided an apparatus. The apparatus includes an encoder for encoding image data for a picture in a resultant bitstream by controlling a bit allocation during the encoding of the image data responsive to satisfying requirements for a subsequent decoding of the bitstream. The requirements relate to preventing at least one of an underflow condition and an overflow condition in a buffer during the subsequent decoding of the bitstream.

According to another aspect of the present principles, there is provided a method in a video encoder. The method includes encoding image data for a picture in a resultant bitstream by controlling a bit allocation during the encoding of the image data responsive to satisfying requirements for a subsequent decoding of the bitstream. The requirements relate to preventing at least one of an underflow condition and an overflow condition in a buffer during the subsequent decoding of the bitstream.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 2 is a flow diagram showing an exemplary method for hypothetical reference decoder-aware bit allocation, in accordance with an embodiment of the present principles.

DETAILED DESCRIPTION

Figure 1:
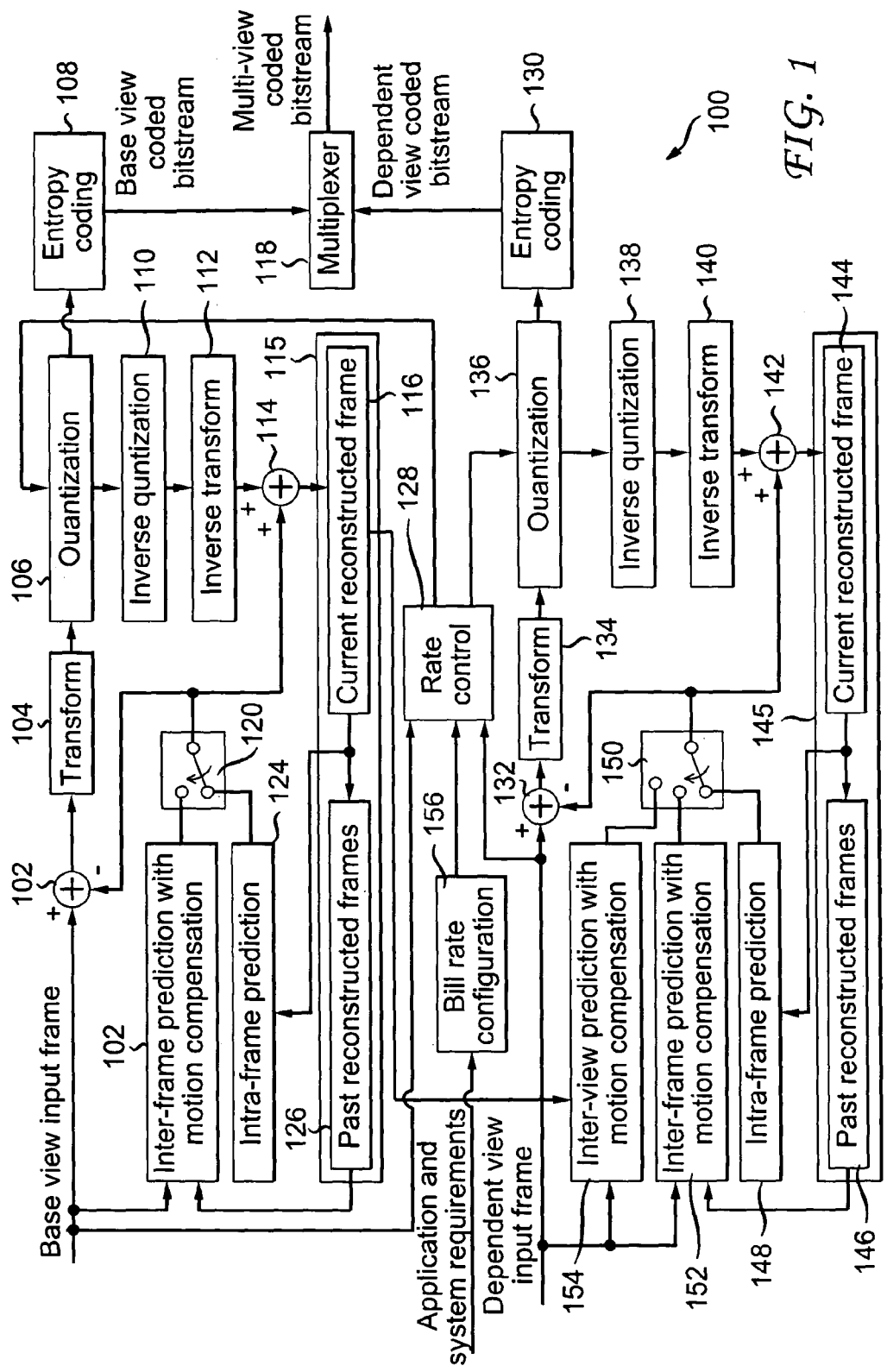
FIG. 1 is a block diagram showing an exemplary multi-view video encoder, in accordance with an embodiment of the present principles.

The present principles are directed to a method and apparatus for video encoding with hypothetical reference decoder compliant bit allocation.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "operation points" refers to any combination of views, for example, with respect to multiple views corresponding to multi-view video content.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed.

Moreover, we note that in one or more embodiments, the present principles can be readily applied to the multi-view video coding (MVC) extension of the MPEG-4 AVC Standard. We further note that the BLU-RAY 3D Specification uses one or more profiles specified in the MVC extension and that the present principles are also readily applicable to the BLU-RAY 3D Specification.

Turning to FIG. 1, an exemplary multi-view video encoder is indicated generally by the reference numeral 100. The video encoder 100 includes a combiner 102 having an output connected in signal communication with an input of a transformer 104. An output of the transformer 104 is connected in signal communication with a first input of a quantizer 106. A first output of the quantizer 106 is connected in signal communication with an input of an inverse quantizer 110. An output of the inverse quantizer 112 is connected in signal communication with an input of an inverse transformer 112. An output of the inverse transformer 112 is connected in signal communication with a first non-inverting input of a combiner 114. An output of the combiner 114 is connected in signal communication with an input of a buffer 115. The buffer 115 stores a current reconstructed frame 116 output from the combiner 114 as well as past reconstructed frames 126 previously output from the combiner 114. A first output of the buffer 115 is connected in signal communication with an input of an intra-frame predictor 124. A second output of the buffer 115 is connected in signal communication with a first input of an inter-frame predictor with motion compensation 122. An output of the intra-frame predictor 126 is connected in signal communication with a first input of a switch 120. An output of the inter-frame predictor with motion compensation 122 is connected in signal communication with a second input of the switch 120. An output of the switch 120 is connected in signal communication with an inverting input of the combiner 102 and a second non-inverting input of the combiner 114. A second output of the quantizer 106 is connected in signal communication with an input of an entropy coder 108. An output of the entropy coder 108 is connected in signal communication with a first input of a multiplexer 118.

An output of a bit rate configurer 156 is connected in signal communication with a first input of a rate controller 128. A first output of the bit rate configure 156 is connected in signal communication with a second input of the quantizer 106. A second output of the rate controller 128 is connected in signal communication with a first input of a quantizer 136. A first output of the quantizer 136 is connected in signal communication with an input of an entropy coder 130. An output of the entropy coder 130 is connected in signal communication with a second input of the multiplexer 118. A second output of the quantizer 136 is connected in signal communication with an input of an inverse quantizer 138. An output of the inverse quantizer 138 is connected in signal communication with an input of an inverse transformer 140. An output of the inverse transformer 140 is connected in signal communication with a first non-inverting input of a combiner 142. An output of the combiner 142 is connected in signal communication with an input of a buffer 145. A first output of the buffer 145 is connected in signal communication with an input of an intra-frame predictor 148. An output of the intra-frame predictor 148 is connected in signal communication with a first input of a switch 150. A second output of the buffer 145 is connected in signal communication with a first input of an inter-frame predictor with motion compensation 152. An output of the inter-frame predictor with motion compensation 152 is connected in signal communication with a second input of the switch 150. A third output of the buffer 115 is connected in signal communication with a first input of an inter-view predictor with motion compensation 154. An output of the inter-view predictor with motion compensation 154 is connected in signal communication with a third input of the switch 150. An output of the switch 150 is connected in signal communication with an inverting input of a combiner 132 and a second non-inverting input of the combiner 142. An output of the combiner 132 is connected in signal communication with an input of a transformer 134. An output of the transformer 134 is connected in signal communication with an input of a quantizer 136.

A non-inverting input of the combiner 102, a second input of the inter-frame predictor with motion compensation 122, and a second input of the rate controller 128 are available as inputs of the MVC video encoder 100, for receiving a base view input frame. An input of the bit rate configure is available as an input of the MVC video encoder 100, for receiving application and system requirements. A third input of the rate controller 128, a non-inverting input of the combiner 132, a second input of the inter-view predictor with motion compensation 154, and a second input of the inter-view predictor with motion compensation 152 are available as inputs of the MVC encoder 100, for receiving a dependent view input frame. An output of the multiplexer 118 is available as an output of the MVC encoder 100, for outputting a multi-view coded bitstream.

As noted above, the present principles are directed to a method and apparatus for video encoding with hypothetical reference decoder compliant bit allocation. Hypothetical reference decoder (HRD) conformance is a normative part of most video compression standards and recommendations. HRD presents a set of requirements on the bitstream for target hardware and/or a software decoder. In accordance with the present principles, we disclose an approach to calculating VBR bit allocation with hypothetical reference decoder consideration.

Terms and Definitions access unit: A set of network abstraction layer (NAL) units always includes exactly one primary coded picture. In addition to the primary coded picture, an access unit may also include one or more redundant coded pictures or other NAL units not including slices or slice data partitions of a coded picture. The decoding of an access unit always results in a decoded picture.

$t_{r,n}(n)$: nominal removal time of access unit n, the nominal time to remove access unit n from the CPB.

$t_r(n)$: actual removal time of access unit n, the actual time to remove access unit n from the CPB and decode instantaneously.

$t_{ai}(n)$: initial arrival time of access unit n, the time at which the first bit of access unit n begins to enter the CPB.

$t_{af}(n)$: final arrival time of access unit n, the time at which the last bit of access unit n enters the CPB $t_c$: a clock tick, the time of one clock cycle.

Picture timing Supplemental Enhancement Information (SEI) message is a syntax structure that stores the picture timing information, such as cpb_removal_delay, dpb_output_delay.

Buffering period Supplemental Enhancement Information (SEI) message is a syntax structure that stores the buffering period information, such as initial_cpb_removal_delay.

Buffering period: the set of access units between two instances of the buffering period SEI message in decoding order.

SchedSelIdx: the index indicating which set of HRD parameters (transmission rate, buffer size and initial buffer fullness) is selected. A bitstream can be compliant with multiple sets of HRD parameters.

The MPEG-4 AVC Standard hypothetical reference decoder utilizes a constrained arrival time leaky bucket (CAT-LB) model for virtual buffer modeling. The virtual buffer (coded picture buffer, CPB) is placed between the channel and the decoder. The leaky bucket model is characterized by three parameters: B, which denotes the buffer size; BitRate, which denotes the bit rate at which the bits are entering the CPB; and F, which denotes the initial buffer fullness, which specifies the initial buffer accumulation before decoding the first picture. F can also be equivalently expressed by initial CPB removal delay (initial_cpb_removal_delay), which means how long to wait before the start of the decoding of the first picture.

Operation of Coded Picture Buffer

The operations of coded picture buffer (CPB) in VBR mode are described as follows.

Derivation of Initial Arrival Time

If the access unit is access unit 0, then the following applies:

$$t_{ai}(0)=0, \quad (1)$$

otherwise, (the access unit is access unit n with n>0), the following applies:

$$t_{ai}(n)=\max(t_{af}(n-1), t_{ai,earliest}(n)) \quad (2)$$

Regarding Equation (2), $t_{ai,earliest}(n)$ is derived as follows:
If access unit n is not the first access unit of a subsequent buffering period, $t_{ai,earliest}(n)$ is derived as follows:

$$t_{ai,earliest}(n)=t_{r,n}(n)-(\text{initial\_cpb\_removal\_delay}[SchedSelIdx]+\text{initial\_cpb\_removal\_delay\_offset}[SchedSelIdx])\div 90000 \quad (3)$$

Otherwise (access unit n is the first access unit of a subsequent buffering period), $t_{ai,earliest}(n)$ is derived as follows:

$$t_{ai,earliest}(n)=t_{r,n}(n)-(\text{initial\_cpb\_removal\_delay}[SchedSelIdx]\div 90000) \quad (4)$$

with initial_cpb_removal_delay[SchedSelIdx] and initial_cpb_removal_delay_offset[SchedSelIdx] being specified in the buffering period SEI message associated with access unit n.

Derivation of Final Arrival Time

The final arrival time for access unit n is derived by the following:

$$t_{af}(n)=t_{ai}(n)+b(n)/BitRate[SchedSelIdx] \quad (5)$$

where "b(n)" is the bits of access unit n. BitRate is the channel bit rate.

Derivation of Nominal Removal Time

For access unit 0, the nominal removal time of the access unit from the coded picture buffer is specified by the following:

$$t_{r,n}(0)=\text{initial\_cpb\_removal\_delay}[SchedSelIdx]\div 90000 \quad (6)$$

For the first access unit of a buffering period that does not initialize the hypothetical reference decoder, the nominal removal time of the access unit from the coded picture buffer is specified by the following:

$$t_{r,n}(n)=t_{r,n}(n_b)+t_c * \text{cpb\_removal\_delay}(n) \quad (7)$$

where $t_{r,n}(n_b)$ is the nominal removal time of the first access unit of the previous buffering period and cpb_removal_delay (n) is the value of cpb_removal_delay specified in the picture timing SEI message associated with access unit n.

When an access unit n is the first access unit of a buffering period, $n_b$ is set equal to n at the removal time of access unit n.

The nominal removal time $t_{r,n}(n)$ of an access unit n that is not the first access unit of a buffering period is given by the following:

$$t_{r,n}(n)=t_{r,n}(n_b)+t_c * \text{cpb\_removal\_delay}(n) \quad (8)$$

where $t_{r,n}(n_b)$ is the nominal removal time of the first access unit of the current buffering period and cpb_removal_delay (n) is the value of cpb_removal_delay specified in the picture timing SEI message associated with access unit n.

Bitstream Conformance for VBR

For conforming bitstreams, the following conditions for the coded picture buffer shall be satisfied:
For each access unit n, with n>0, associated with a buffering period SEI message, with $\Delta t_{g,90}(n)$ specified by the following:

$$\Delta t_{g,90}(n)=90000*(t_{r,n}(n)-t_{af}(n-1)) \quad (9)$$

The value of initial_cpb_removal_delay[SchedSelIdx] shall be constrained as follows:

$$\text{initial\_cpb\_removal\_delay}[SchedSelIdx]<=Ceil(\Delta t_{g,90}(n)) \quad (10)$$

A CPB overflow is specified as the condition in which the total number of bits in the CPB is larger than the CPB size. The CPB shall never overflow.

A CPB underflow is specified as the condition in which $t_{r,n}(n)$ is less than $t_{af}(n)$. When low_delay_hrd_flag is equal to 0, the CPB shall never underflow.

For VBR, the CAT_LB leaky bucket model guarantees that the coded picture buffer never overflows. The encoder only needs to control the bit rate fluctuations so that the coded picture buffer does not underflow.

We propose an approach for bit allocation that guarantees no coded picture buffer underflow occurrences.

The cause of coded picture buffer underflow is that the number of bits accumulated over a range of pictures prior to the underflow is too high. To prevent coded picture buffer underflow, the bits of those pictures shall be constrained. We presume that a bit allocation underflows the coded picture buffer at picture n. The range of pictures that contribute to the underflow is from picture i to picture n, inclusive, where i is the nearest picture prior to picture n such that $t_{ai}(i)=t_{ai,earliest}(i)$. Due to the coded picture buffer operation in Equation (2), reducing the bit rate before of picture i will not advance the arrival time of picture n ($t_{ai}(n)$). Therefore, the pictures prior to picture i are irrelative to $t_{af}(n)$. For a burst of consecutive occurrences of coded picture buffer underflow, n is the last one.

The reasoning behind the proposed approach will now be discussed. A bit allocation is tested by the hypothetical reference decoder with a certain buffer size. When a burst of consecutive occurrences of coded picture buffer underflow is detected, the bits for pictures contributing to the last coded picture buffer underflow n will be reduced by a total amount of be[$t_{af}(n)-t_{r,n}(n)$], where "be" means "bit equivalent". The reduction for each picture is proportional to the number of bits exceeding the average bits of picture i to n. The approach is executed iteratively until no coded picture buffer underflow occurs for all pictures. For pictures associated with a buffering period SEI, the initial_cpb_removal_delay is set to initial_cpb_removal_delay[SchedSelIdx]=Ceil($\Delta t_{g,90}(n)$).

Turning to FIG. 2, an exemplary method for hypothetical reference decoder-aware bit allocation is indicated generally by the reference numeral 200. The method 200 includes a start block 205 that passes control to a function block 210. The function block 210 obtains an initial bit allocation, and passes control to a function block 215. The function block 215 goes to the first picture, and passes control to a function block 220. The function block 220 calculates $t_{ai}$, $t_{ai,earliest}$, $t_{af}$, and $t_{r,n}$, updates initial_cpb_removal_delay if the current picture is the start of the buffering period (noting that only the updating of initial_cpb_removal_delay is bypassed (i.e., not performed) when the current picture is not the start of buffering period), and passes control to a decision block 225. The decision block 225 determines whether or not $t_{ai}=t_{ai,earliest}$. If so, then control is passed to a function block 230. Otherwise, control is passed to a decision block 235. The function block 230 marks the current picture as i, and passes control to the decision block 235. The decision block 235 determines whether or not a coded picture buffer underflow exists. If so, then control is passed to a decision block 240. Otherwise, control is passed to a decision block 260. The decision block 240 determines whether or not the next picture also causes a coded picture buffer underflow. If so, then control is passed to a function block 255. Otherwise, control is passed to a function block 245. The function block 255 goes to the next picture, and returns control to the function block 220. The function bock 245 marks the current picture as n, and passes control to a function block 250. The function block 250 reduces the bit rate of the current picture from i to n, and returns control to the function block 215. The function block 260 determines whether or not the current picture is the last picture. If so, then control is passed to the function block 255. Otherwise, control is passed to a function block 265. The function block 265 encodes pictures and corresponding syntax into a resultant bitstream, and passes control to an end block 299. Regarding function block 250, the bit reduction performed thereby is proportional to the bits exceeding the average bits of picture i to n. The total amount of the bit reduction is be$[t_{af}(n)-t_{r,n}(n))]$.

The multi-view video coding (MVC) extension of the MPEG-4 AVC Standard was adopted by BLU-RAY for stereoscopic video coding (BLU-RAY 3D). Additional constraints on the hypothetical reference decoder are imposed. Any combination of views is called an operation point. The hypothetical reference decoder shall be tested for each operation point. For example, in BLU-RAY 3D, there are two views: the base view; and the dependent view. Three operation points are defined as follows: base view only; dependent view only; and joint base and dependent view. Each operation point shall be tested by the hypothetical reference decoder. For synchronization of the decoding time of different views, it is required that the buffering period SEIs of all operation points associated with the same access unit shall be identical, which means the initial_cpb_removal_delay of all operation points of the same buffering period shall be identical.

Figure 3:
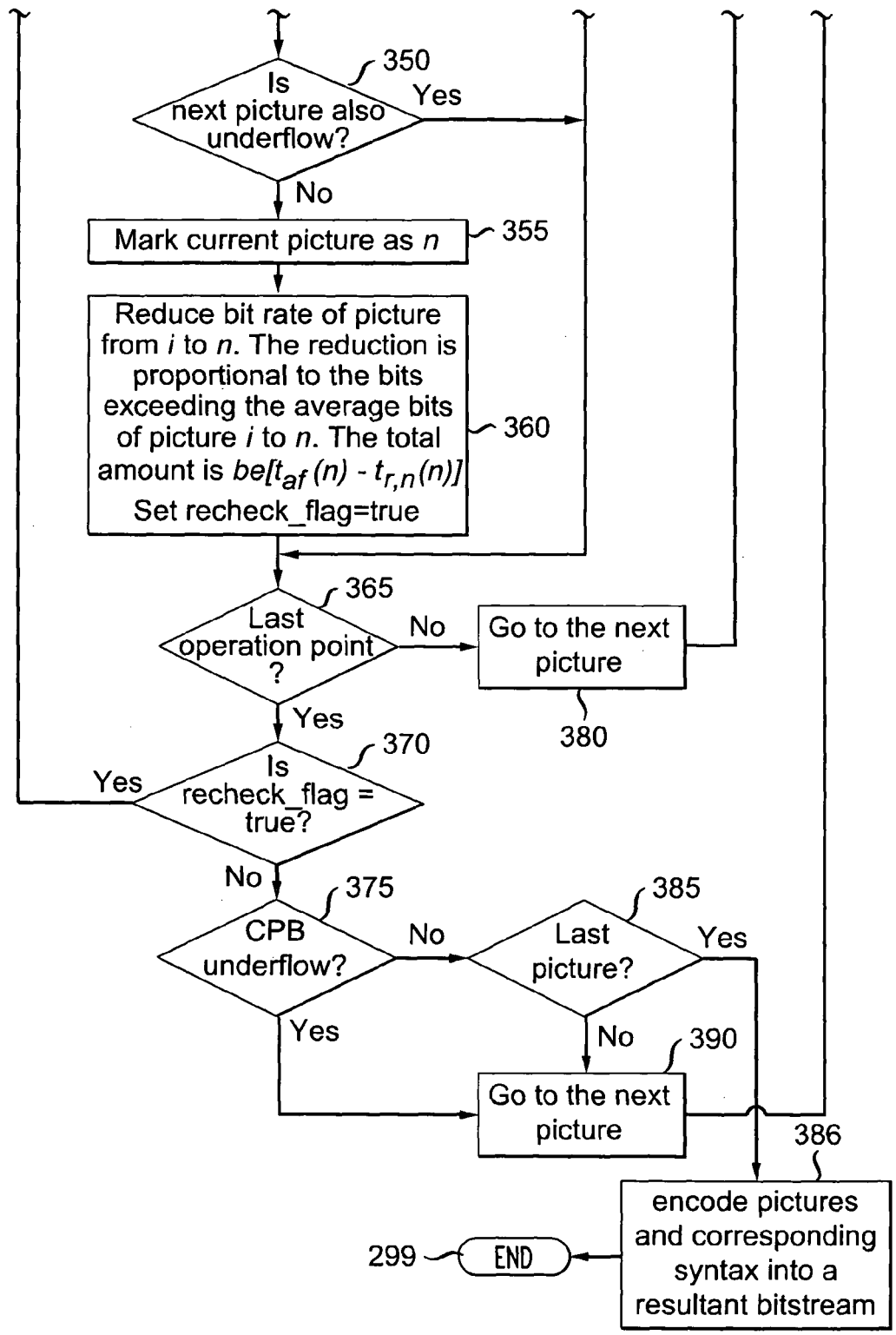
FIG. 3 is a flow diagram showing an exemplary method for hypothetical reference decoder bit allocation for BLU-RAY 3D, in accordance with an embodiment of the present principles.

Turning to FIG. 3, an exemplary method for hypothetical reference decoder bit allocation for BLU-RAY 3D is indicated generally by the reference numeral 300. The method 300 includes a start block 305 that passes control to a function block 310. The function block 310 obtains the initial bit allocation, and passes control to a function block 315. The function block 315 goes to the first picture, and passes control to a function block 320. The function block 320, for each operation point, calculates $t_{ai}$, $t_{ai,earliest}$, $t_{af}$, and $t_{r,n}$ updates initial_cpb_removal_delay if the current picture is the start of the buffering period (noting that only the updating of initial_cpb_removal_delay is bypassed (i.e., not performed), and passes control to a function block 325. The function block 325 sets the common initial_cpb_removal_delay as the minimum of initial_cpb_removal_delay of all operation points, and passes control to a function block 330. The function block 330 goes to the first operation point, and passes control to a decision block 335. The decision block 335 determines whether or not $t_{ai}=t_{ai,earliest}$. If so, then control is passed to a function block 340. Otherwise, control is passed to a decision block 345. The function block 340 marks the current picture as i, and passes control to the decision block 345. The decision block 345 determines whether or not a coded picture buffer underflow exists. If so, then control is passed to a decision block 350. Otherwise, control is passed to a decision block 365. The decision block 350 determines whether or not the next picture also causes a coded picture buffer underflow. If so, then control is passed to the decision block 365. Otherwise, control is passed to a function block 355. The decision block 365 determines whether or not the current operation point is the last operation point. If so, then control is passed to a decision block 370. Otherwise, control is passed to a function block 380. The decision block 370 determines whether or not recheck_flag=true. If so, then control is returned to the function block 315. Otherwise, control is passed to a decision block 375. The decision block 375 determines whether or not a coded picture buffer underflow exists. If so, then control is passed to a function block 390. Otherwise, control is passed to a decision block 385. The function block 390 goes to the next picture, and returns control to the function block 320. The decision block 385 determines whether or not the current picture is the last picture. If so, then control is passed to a function block 386. Otherwise, control is passed to the function block 390. The function block 386 encodes pictures and corresponding syntax into a resultant bitstream, and passes control to an end block 399. Regarding function block 360, the bit reduction performed thereby is proportional to the bits exceeding the average bits of picture i to n. The total amount of the bit reduction is be$[t_{af}(n)-t_{r,n}(n)]$.

A description will now be given of some of the many attendant advantages/features of the present invention, some of which have been mentioned above. For example, one advantage/feature is an apparatus having an encoder for encoding image data for a picture in a resultant bitstream by controlling a bit allocation during the encoding of the image data responsive to satisfying requirements for a subsequent decoding of the bitstream, the requirements relating to preventing at least one of an underflow condition and an overflow condition in a buffer during the subsequent decoding of the bitstream.

Another advantage/feature is the apparatus having the encoder as described above, wherein the requirements pertain to at least one of a particular video coding standard and a particular video coding recommendation.

Yet another advantage/feature is the apparatus having the encoder as described above, wherein the bit allocation is controlled by at least applying a bit constraint over a range of pictures contributing to the underflow condition.

Still another advantage/feature is the apparatus having the encoder wherein the bit allocation is controlled by at least applying a bit constraint over a range of pictures contributing to the underflow condition as described above, wherein the range of pictures starts at from a nearest picture prior to the underflow condition, the nearest picture having an arrival time at the buffer equal to an earliest arrival time at which a first bit for a buffering period to which the nearest picture belongs begin to enter the buffer.

Still yet another advantage/feature is the apparatus having the encoder wherein the bit allocation is controlled by at least applying a bit constraint over a range of pictures contributing to the underflow condition as described above, wherein the range of pictures ends at a last picture corresponding to a burst of consecutive occurrences of the underflow condition.

Still yet another advantage/feature is the apparatus having the encoder wherein the range of pictures ends at a last picture corresponding to a burst of consecutive occurrences of the underflow condition as described above, wherein a total amount of a bit reduction resulting from the bit constraint is a bit equivalent of $[t_{af}(n)-t_{r,n}(n)]$, wherein $t_{af}(n)$ denotes a final arrival time at which a last bit of the last picture enters the buffer, and $t_{r,n}(n)$ denotes a nominal removal time to entirely remove the last picture from the buffer.

Moreover, another advantage/feature is the apparatus having the encoder wherein a total amount of a bit reduction resulting from the bit constraint is a bit equivalent of $[t_{af}(n)-t_{r,n}(n)]$ as described above, wherein the bit reduction of each of the pictures within the range of pictures is proportional to a number of bits exceeding a bit average calculated over the range of pictures.

Further, another advantage/feature is the apparatus having the encoder as described above, wherein the encoder encodes the resultant bitstream in compliance with the multi-video video coding extension of the International Organization for Standardization/International Electrotechnical Commission Moving Picture Experts Group-4 Part 10 Advanced Video Coding Standard/International Telecommunication Union, Telecommunication Sector H.264 Recommendation.

Also, another advantage/feature is the apparatus having the encoder wherein the encoder encodes the resultant bitstream in compliance with the multi-video video coding extension of the International Organization for Standardization/International Electrotechnical Commission Moving Picture Experts Group-4 Part 10 Advanced Video Coding Standard/International Telecommunication Union, Telecommunication Sector H.264 Recommendation as described above, wherein the resultant bitstream is encoded in compliance with the BLU-RAY 3D Specification.

Also, another advantage/feature is the apparatus having the encoder wherein the resultant bitstream is encoded in compliance with the BLU-RAY 3D Specification as described above, wherein the picture corresponds to multi-view video content for at least two views, and a common value of a syntax element initial_cpb_removal_delay is used for all operation points of a buffering period to which the picture applies, the common value being equal to a minimum value of the syntax element initial_cpb_removal_delay of all the operation points of the buffering period.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
an encoder for encoding image data for a picture in a bitstream by controlling a bit allocation during the encoding of the image data responsive to satisfying requirements for a subsequent decoding of the bitstream, the requirements relating to preventing at least one of an underflow condition and an overflow condition in a buffer during the subsequent decoding of the bitstream,
wherein the bit allocation is controlled by at least applying a bit constraint over a range of pictures contributing to the underflow condition, and
wherein the range of pictures starts at from a nearest picture prior to the underflow condition, the nearest picture having an arrival time at the buffer equal to an earliest arrival time at which a first bit for a buffering period to which the nearest picture belongs begin to enter the buffer.

2. The apparatus of claim 1, wherein the requirements pertain to at least one of a particular video coding standard and a particular video coding recommendation.

3. The apparatus of claim 1, wherein the range of pictures ends at a last picture corresponding to a burst of consecutive occurrences of the underflow condition.

4. The apparatus of claim 3, wherein a total amount of a bit reduction resulting from the bit constraint is a bit equivalent of $[t_{af}(n)-t_{r,n}(n)]$, wherein $t_{af}(n)$ denotes a final arrival time at which a last bit of the last picture enters the buffer, and $t_{r,n}(n)$ denotes a nominal removal time to entirely remove the last picture from the buffer.

5. The apparatus of claim 4, wherein the bit reduction of each of the pictures within the range of pictures is proportional to a number of bits exceeding a bit average calculated over the range of pictures.

6. The apparatus of claim 1, wherein said encoder encodes the bitstream in compliance with the multi-video video coding extension of the International Organization for Standardization/International Electrotechnical Commission Moving Picture Experts Group-4 Part 10 Advanced Video Coding Standard/International Telecommunication Union, Telecommunication Sector H.264 Recommendation.

7. The apparatus of claim 6, wherein the bitstream is encoded in compliance with the BLU-RAY 3D Specification.

8. The apparatus of claim 7, wherein the picture corresponds to multi-view video content for at least two views, and a common value of a syntax element initial_cpb_removal_delay is used for all operation points of a buffering period to which the picture applies, the common value being equal to a minimum value of the syntax element initial_cpb_removal_delay of all the operation points of the buffering period.

9. The apparatus of claim 1, wherein the range of pictures over which the bit constraint is applied is less than all pictures in the bitstream.

10. The apparatus of claim 1, wherein the buffering period comprises the set of access units between two instances of the buffering period SEI message in decoding order.

11. In a video encoder, a method, comprising:
encoding image data for a picture in a bitstream by controlling a bit allocation during the encoding of the image data responsive to satisfying requirements for a subsequent decoding of the bitstream, the requirements relating to preventing at least one of an underflow condition and an overflow condition in a buffer during the subsequent decoding of the bitstream,
wherein the bit allocation is controlled by at least applying a bit constraint over a range of pictures contributing to the underflow condition, and wherein the range of pictures starts at from a nearest picture prior to the underflow condition, the nearest picture having an arrival time at the buffer equal to an earliest arrival time at which a first bit for a buffering period to which the nearest picture belongs begin to enter the buffer.

12. The method of claim 11, wherein the requirements pertain to at least one of a particular video coding standard and a particular video coding recommendation.

13. The method of claim 11, wherein the range of pictures ends at a last picture corresponding to a burst of consecutive occurrences of the underflow condition.

14. The method of claim 13, wherein a total amount of a bit reduction resulting from the bit constraint is a bit equivalent of $[t_{af}(n)-t_{r,n}(n)]$, wherein $t_{af}(n)$ denotes a final arrival time at which a last bit of the last picture enters the buffer, and $t_{r,n}(n)$ denotes a nominal removal time to entirely remove the last picture from the buffer.

15. The method of claim 14, wherein the bit reduction of each of the pictures within the range of pictures is proportional to a number of bits exceeding a bit average calculated over the range of pictures.

16. The method of claim 11, wherein the bitstream is encoded in compliance with the multi-video video coding extension of the International Organization for Standardization/International Electrotechnical Commission Moving Picture Experts Group-4 Part 10 Advanced Video Coding Standard/International Telecommunication Union, Telecommunication Sector H.264 Recommendation.

17. The method of claim 16, wherein the bitstream is encoded in compliance with the BLU-RAY 3D Specification.

18. The method of claim 17, wherein the picture corresponds to multi-view video content for at least two views, and a common value of a syntax element initial_cpb_removal_delay is used for all operation points of a buffering period to which the picture applies, the common value being equal to a minimum value of the syntax element initial_cpb_removal_delay of all the operation points.

19. The method of claim 11, wherein the range of pictures over which the bit constraint is applied is less than all pictures in the bitstream.

20. The method of claim 11, wherein the buffering period comprises the set of access units between two instances of the buffering period SEI message in decoding order.

* * * * *